Nov. 6, 1956 — T. BROWN — 2,769,641
REVERSIBLE FEED FOR MANURE SPREADERS
Filed April 10, 1953 — 3 Sheets-Sheet 1

INVENTOR.
THEOPHILUS BROWN
ATTORNEYS

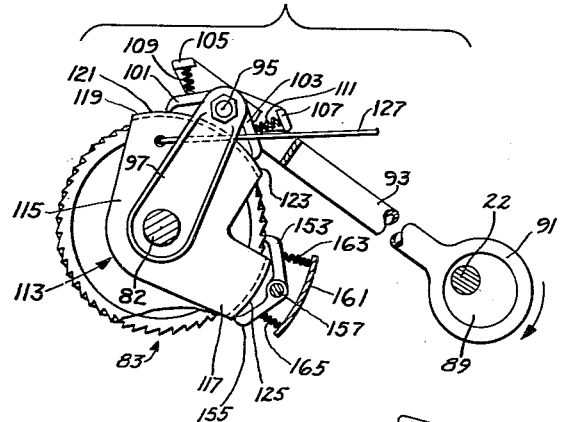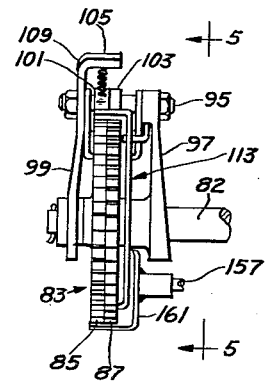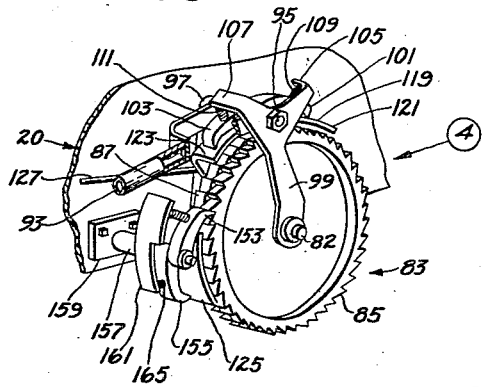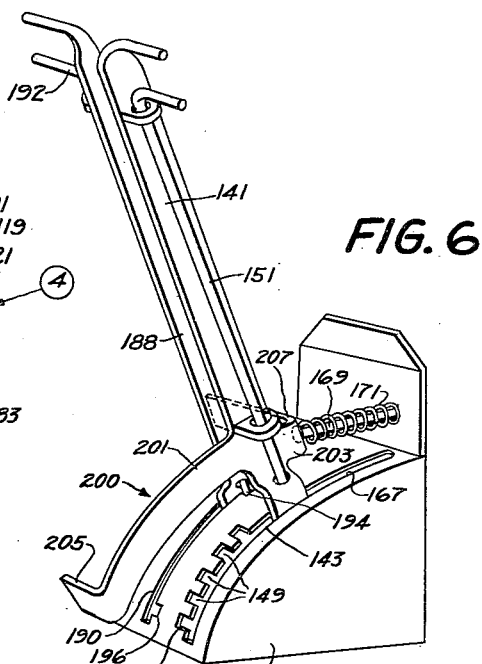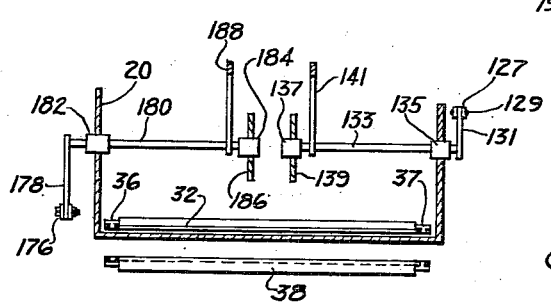

Nov. 6, 1956     T. BROWN     2,769,641
REVERSIBLE FEED FOR MANURE SPREADERS
Filed April 10, 1953     3 Sheets-Sheet 3
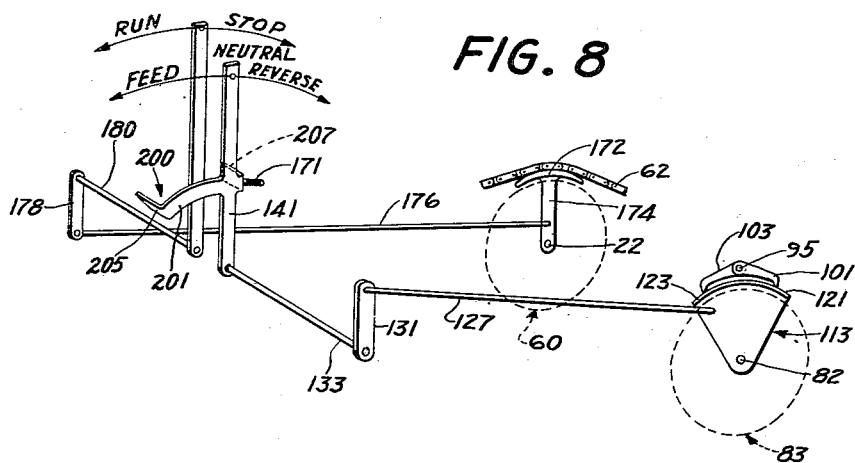
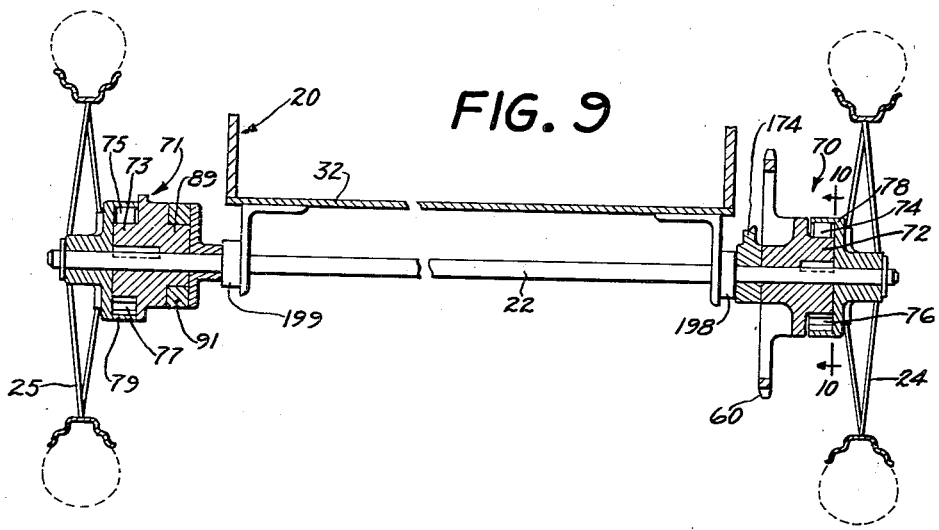
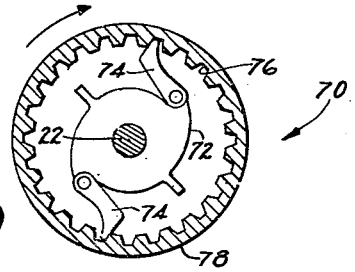
INVENTOR.
THEOPHILUS BROWN
ATTORNEYS United States Patent Office 2,769,641
Patented Nov. 6, 1956

2,769,641

REVERSIBLE FEED FOR MANURE SPREADERS

Theophilus Brown, Moline, Ill., assignor to Deere & Company, Moline, Ill., a corporation of Illinois Application April 10, 1953, Serial No. 348,041

13 Claims. (Cl. 275—5)

This invention relates to a manure spreader and more particularly to reversible feed mechanism therefor.

The typical manure spreader is in the form of a wagon or trailer, normally drawn by a tractor or other vehicle over a field, and having a rear end through which manure is discharged by beater and distributor means. The floor of the body of the spreader has a normally longitudinally rearwardly movable apron or equivalent feeder for advancing the manure in increments to the discharging and distributing beaters.

Because of the present day practice of loading the spreader by a power loader, the manure is heaped into the body in much larger chunks than when pitched in by hand, and very often these chunks are so large and compacted as to overload the beater means. Particularly when these chunks are frozen or otherwise excessively compacted, they will cause the beater means to stop. Since the beater derives its power from either the towing tractor or directly from the spreader wheels, the overload, if it does not cause damage, requires that the machine be stopped until the obstructing chunk can be broken up. Obviously, this is a laborious task, as well as being time consuming.

According to the present invention, reversible drive mechanism for the apron or feed means is used to give the operator mechanism for reversing the apron when overloads occur. In other words, the apron normally runs so that it feeds the manure rearwardly to the beater and distributor means. With the mechanism provided by the present invention, the operator can reverse the direction of movement of the feeder and consequently he can move the load away from the beater and distributor means. If the load is not too compact, it is possible that the spreader may be again started, running only the beater and distributing means until the discharge end is cleared and then advancing the load more slowly so as to enable the beaters to break up the large chunks. If the chunk or chunks are of such size as to render impossible the foregoing procedure, at least the reversely moving apron will serve to bring the compacted portion of the load out where it is more readily accessible to breaking up manually.

It is an important object of the invention to utilize the reversing mechanism in such a manner that it may be readily adapted to spreaders of existing types without materially altering the basic construction of such spreaders. It is also an object of the invention to produce a reversing mechanism that is simple in construction and easy to maintain.

A further object of the invention relates to the coordination of the control of the reversible means and the means for driving the beaters. When an overload occurs, it is desirable to disconnect the drive to the beaters, particularly when the beaters are driven from one of the spreader wheels. This will relieve part of the draft load on the spreader so that it may be drawn forwardly to utilize that power for moving the apron in a non-feeding or reverse direction. Accordingly, the control members respectively for the reversible feed drive means and the beater means are coordinated so that the beater drive means must first be disconnected before the feed drive means can be reversed. It is a further feature of the invention to use the coordinating means just referred to to prevent normal feeding operation of the feed means until the beater control member is first moved to its "run" position. Again, it is an object of the invention to adapt the coordinated control to spreaders of existing types.

The foregoing and other important objects and desirable features encompassed by and inherent in the invention will become apparent as a preferred embodiment of the invention is disclosed in detail in the following description and accompanying sheets of drawings in which Fig. 1 is a perspective view of a typical spreader.

Fig. 3 is a perspective view of the reversible step-by-step mechanism for the feeder or apron.

Fig. 4 is an elevational view of the mechanism shown in Fig. 3, the view being taken generally in the direction of the arrow bearing the encircled numeral 4.

Fig. 5 is a fragmentary sectional view as seen along the line 5—5 of Fig. 4.

Fig. 6 is a fragmentary perspective view of the coordinated control levers.

Fig. 7 is a somewhat schematic view representing a cross section taken through a front portion of the body and illustrating the mounting of the control levers and their associated parts.

Fig. 8 is a schematic view showing the relationship of the levers to the drive means that they respectively control.

Fig. 9 is a transverse sectional view taken through the rear axle of the spreader and showing the manner in which the beater and feed means respectively derive their power from the spreader rear wheels.

Fig. 10 is a sectional view, on an enlarged scale, as seen on the line 10—10 of Fig. 9.

Figure 1:
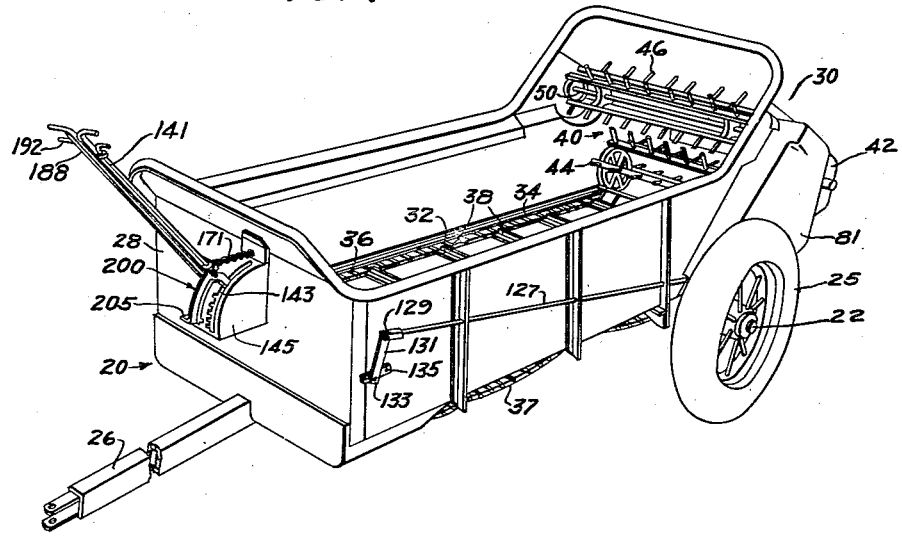

Directional expressions (e. g., front, rear, right, left, top, bottom) are used in the specification and claims as words of convenience and not of limitation, except as particularly specified. Likewise, the specific disclosure is exemplary and not exclusive of equivalent variations within the spirit of the invention.

The spreader chosen for purposes of illustration is not materially different in fundamentals from spreaders of several well-known designs. That selected here is of the tractor-drawn type having a main body 20 carried on a transverse rear axle 22 on which are journaled right- and left-hand wheels 24 and 25. Connection to a tractor (not shown) may be conventionally made by a forwardly extending draft tongue 26. This spreader is therefore in the form of a two-wheeled trailer and the body has a closed front end 28 and an open rear end designated generally by the numeral 30. The body also includes a bottom or floor 32 over which moves the upper run of an endless-belt type conveyor or feed means 34, commonly known as an apron.

Familiarity with the general basic characteristics of spreaders is assumed. Accordingly, the description of such components will be rather general and brief. As is well known, the apron 34 may comprise a pair of transversely spaced, longitudinally running chains 36 and 37 cross-connected by a plurality of transverse slats 38. When the body is loaded with manure, and when the apron is driven so that its upper run travels rearwardly, or toward the discharge end 30 of the spreader, the body-contained manure will be moved in such rearward direction to be distributed. Distribution is facilitated by beater means 40 and a wide-spread auger 42, both of which may be of conventional construction. The beater means comprises a lower beater 44 and an upper beater 46. These beaters are carried respectively on lower and upper shafts 48 and 50. The purpose of the beaters is to disintegrate the manure as it approaches so that the manure is broken up into smaller portions for easier wide-spread distribution by the auger 42.

Figure 2:
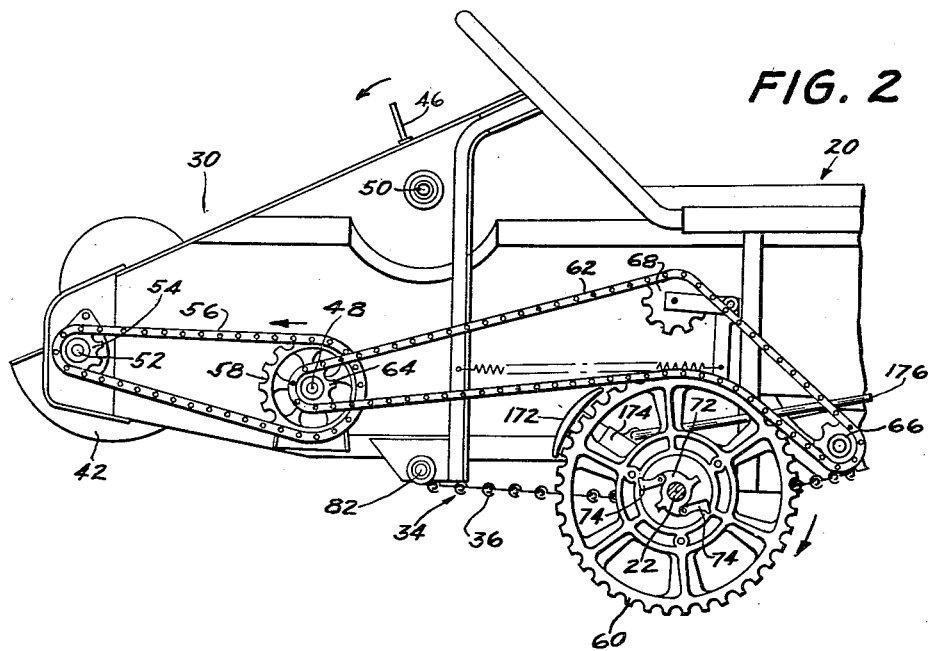
Fig. 2 is a fragmentary view of the right-hand rear portion of the spreader, the right-hand rear wheel having been omitted in the interests of clarity.

As best shown in Fig. 2, the auger is carried on a transverse shaft 52 that projects at the right-hand side of a rear portion of the spreader. The shaft at this portion has keyed thereto a sprocket 54 about which is trained a driving chain 56. This chain is trained in turn about a sprocket 58 keyed to the lower beater shaft 48. The rear axle 22 has keyed thereto at a right-hand end portion thereof just inwardly of the right-hand wheel 24 a power input sprocket 60. A driving chain 62 is trained about a second sprocket 64 keyed to the lower beater shaft 48 and has its lower run trained over an upper portion of the power input sprocket 60. The remainder of the chain 62 is carried by appropriate idlers 66 and 68. When the lower run of the chain 62 is in engagement with the sprocket 60, the chain will be driven as the spreader advances.

As best illustrated in Fig. 9, the axle 22, and accordingly the sprocket 60, receives power from the wheel via a suitable one-way or overrunning clutch, designated here by the numeral 70. The sprocket 60 has a hub 72 formed integral therewith, and this hub has a pair of pivoted pawls 74 engageable with the toothed or notched inner periphery 76 of a drum 78 coaxial and rotatable with the wheel 24. As long as the wheel 24 is rolling in a forward direction, the pawls 74 serve as driving means between the drum 78 and the sprocket hub 72, the notched periphery 76 being formed in such manner that drive will not be transmitted when the wheel 24 is reversed, or when the wheel 24 is overrun by the axle 22 because of the faster driving of the axle 22 by the left-hand wheel 25 as when the spreader is turning to the right.

The axle 22 is additionally driven by the left-hand wheel 25, as suggested above. The driving means includes an overrunning clutch, designated generally by the numeral 71, very similar to that previously described. This clutch includes a central hub 73, keyed to the axle 22, and an outer drum 79 formed integral with the hub of the wheel 25 and having a notched inner periphery 77 which is engageable with pawls 75 as long as the wheel 25 is running forwardly, or as long as the wheel 25 is not overrun by the axle 22 as when the spreader is turning to the left.

As already described, the beaters 44 and 46 and the auger 42 are rotated by mechanism deriving its power from the right-hand wheel 24. The drive to the upper beater 50 is established by means of suitable sprockets and a chain (not shown) at the left-hand side of the machine and covered in Fig. 1 by a shield 81. These details are, however, not important, and further elaboration is deemed unnecessary.

As is conventional, the feed means or apron 34 is carried at its front and rear ends on appropriate transverse shafts and sprockets. Such a shaft is illustrated at 82 in Fig. 2 for the rear end of the feed means. A similar shaft at the front end of the feed means is not illustrated, but its presence can be readily inferred on the basis of conventional design. Apart from unconventional machines designed especially as self-loaders, aprons in spreaders of the conventional type heretofore known have been driven in only one direction; that is, a direction in which the upper run travels rearwardly to carry the body-contained manure to the beaters 44 and 46. Convention and experience have dictated the use of incremental feeding mechanism normally in the form of step-by-step means or pawl and ratchet drive means. In the interests of retaining the features of conventional design, as well as adding thereto the important features of the present design, the invention utilizes reversible step-by-step means, best shown in Figs. 3, 4 and 5. The pawl and ratchet wheel mechanism has been adopted in the preferred form of the invention.

As best shown in the figures just referred to, this mechanism includes ratchet wheel means, designated generally by the numeral 83, and comprising first and second ratchet wheels 85 and 87, keyed in coaxial relationship to the rear apron or feed means shaft 82, which shaft thus constitutes power input means for the feed means or apron 34. As best shown in Figs. 3 and 5, the teeth of the outer ratchet wheel 85 point in a circumferential counterclockwise direction, while the teeth of the inner ratchet wheel 87 point in a circumferential clockwise direction. All this mechanism is enclosed by the shield 81 in Fig. 1, but the relationship of the ratchet wheel means 83 to the driving axle 22 can be recognized from Fig. 5, but it must be appreciated that the view in Fig. 5 is seen from the right along the line 5—5 of Fig. 4.

The hub 73 of the left-hand one-way clutch 71 has an integral portion 89 (Fig. 9) extending to the right. This portion is in the form of an eccentric (Fig. 5) encircled by a collar 91 to which is rigidly affixed a reciprocating means in the form of a pitman 93. The other end of the pitman is pivotally connected at 95 to the upper end of a driving member or pawl carrier 97. The pawl carrier is journaled on the apron or feed means shaft 82. Thus, as the pitman 93 is reciprocated by rotation of the eccentric 89, the pawl carrier 97 is oscillated about its pivot on the apron shaft 82.

The pivot pin 95 that connects the pitman 93 to the pawl carrier 97 extends outwardly or to the left along an axis parallel to the axis of the apron shaft 82 and pivotally receives the upper end of an arm 99 that may, for all practical purposes, be considered part of the pawl carrier 97. This arm is pivoted at its lower end to the apron or feed means shaft 82. The pin 95 serves as means for the coaxial mounting of first and second drive means in the form of first and second pawls 101 and 103. The pawl 101 extends in a circumferential clockwise direction and thus is adapted to engage the teeth on the outer ratchet wheel 85. The pawl 103 extends in the opposite direction and is engageable with the teeth of the inner ratchet wheel 87, the pawls being axially offset on the order of the axial offset of the ratchet wheels 85 and 87. The upper end of the arm 99 is bifurcated at 105 and 107 to provide respectively for the spring loading or biasing of the pawls 101 and 103 as at 109 and 111.

The driving mechanism 83 includes pawl-control means, designated generally by the numeral 113. This means takes the form of a bell crank having first and second arms 115 and 117, the arm 115 having an arcuate flange 119 provided with axially offset portions 121 and 123 respectively underlying the pawls 101 and 103. The other arm 117 has a relatively shorter arcuate flange 125 for a purpose to be presently described.

The control element 113 is journaled or rockable on the apron shaft 82 and its angular position relative to the pawls 101 and 103 is adjustable through the medium of a control rod 127 that extends forwardly to a pivotal connection 129 with the upper end of a control arm 131. The lower end of the arm 131 is keyed to a transverse rockshaft 133 journaled in a bearing 135 in the left-hand side wall of the spreader body and journaled at its inner end in a bearing 137 suitably supported by a bracket 139 adjacent a midpoint of the spreader body.

A control lever or member 141 is fixed at its lower end to the rockshaft 133 and extends upwardly through a slot 143 in an arcuate control plate 145.

Ignoring for the moment other details and assuming for the moment that the control lever 141 is rockable through a range between its position in Fig. 6 and the position it would occupy when coincident with a lowermost notch 147 at one edge of the slot 143, motion will be transmitted through the control rod 127 to the control means 113 to adjust the arcuate portions 121 and 123 thereon with respect to the pawls 101 and 103. The edge of the slot 143 in which the notch 147 is formed is provided with a plurality of other notches 149 for selectively fixing the position of the control lever 141.

When the control lever 141 is in the position shown in Fig. 6, the angular position of the control means 113 relative to the pawls 101 and 103 is such that neither of the pawls can engage either of the ratchet wheels. In other words, the arcuate portions 121 and 123 are pawl-lifting means. Accordingly, as the eccentric 89 rotates, reciprocation transmitted through the pitman 93 to the driving member 97 merely oscillates the driving member and the points of the pawls ride respectively on the arcuate portions 121 and 123. Since reciprocation of the pitman 93 is uniform—that is, its opposite strokes are equal—the control means 113 must be adjusted to vary the amount of this motion that will be transmitted to the ratchet wheel means 83. For this purpose, the control lever 141 may be set in any one of the notches 149 or even in the notch 147 for maximum angular movement of the ratchet wheel means 83 in a clockwise direction as viewed in Fig. 3 (counterclockwise as viewed in Fig. 5). At this point, it should be noted that there is a notch (not shown) in the slot 143 corresponding to the position of the control lever 141 in Fig. 6. The lever has a suitable detent means 151 for positioning the lever selectively in any one of the notches. The principle of adjusting an arm on which is mounted an arcuate flange for controlling engagement of a pawl with a ratchet wheel is not new, being illustrated in U. S. Patent 1,215,614. What is involved is briefly that the arcuate flange 121 is interposed below the pawl 101 in varying amounts, so that when the maximum amount of flange 121 is interposed between the ratchet wheel 85 and the pawl 101, the pawl will merely ride on the flange, and when a minimum amount of flange is interposed between the pawl and ratchet wheel, the pawl will more quickly engage the ratchet teeth so that a greater portion of the oscillation of the arm 97 will be transmitted to the ratchet wheel 85.

During driving of the ratchet wheel 85 in such direction as to move the apron in a rearward or feeding direction, the flange 123 is keeping the pawl 103 out of engagement with the other ratchet wheel 87. The arcuate flange 123 is designed for that purpose.

Also, as previously described, the control means 113 has the second arm 117 on which the arcuate flange 125 is formed. This arcuate flange is for the purpose of controlling a pair of holding pawls 153 and 155. These pawls are coaxially mounted on a shaft 157 that extends outwardly from a bracket 159 secured to the left-hand side of the spreader body 20. Rigid on the shaft 157 is an arcuate member 161 which backs up a pair of biasing means or springs 163 and 165 which act respectively on the pawls 153 and 155. When the mechanism is set for driving the apron in its feeding direction, the holding pawl 155 is kept out of engagement with the ratchet wheel 87, and only the holding pawl 153, which engages the ratchet wheel 85, is effective. The purpose of the holding pawls is, of course, to prevent retrograde movement of the particular ratchet wheel being driven.

The feed-control lever 141 has an additional range of movement (Fig. 6), the arcuate slot 143 being extended rearwardly at 167. When the lever 141 is moved through the range between its position as shown in Fig. 6 and the rear end of the slot 167, force is transmitted from the rockshaft 133, arm 131 and control rod 127 to the pawl-control means 113. During this range of movement, the pawl 101 is kept out of engagement with the ratchet wheel 85 and the pawl 103 is freed or permitted to escape for engagement with the ratchet wheel 87. Since the ratchet wheel 87 is reversed relative to the ratchet wheel 85, the reciprocating motion of the pitman 93 will cause rotation of the apron shaft 82 in a reverse direction (counterclockwise as viewed in Fig. 3, and clockwise as viewed in Fig. 5). Thus, any excessive load imposed on the beaters by the rearwardly moving quantity of manure may be relieved by removing the quantity of manure forwardly, at least sufficiently to enable the beaters to disintegrate the proximate manure when the beaters are restored to operation, or in any event to make more readily accessible to the operator the load of manure so that he can break it up with a shovel or fork.

Since is is not particularly important that the increment of reverse feed be adjusted, there are no notches along either side of the extension 167 of the slot 143. However, the operator is made aware of the reverse range of movement by means of a headed pin 169 surrounded by a compression spring 171 carried by the front wall of the body. The headed end of the pin 169 is engageable with the rear portion of the lever 141 as the lever 141 is moved rearwardly. Thus, the means 169—171 constitutes yieldable means affording resistance to movement of the lever 141 in that range of the slot 143 comprising the slot extension 167.

During reverse operation of the apron, the holding pawls 153 and 155 are controlled by the arcuate flange portion 125 on the arm 117 of the pawl-control means 113.

The drive means for the beaters 44 and 46 and the auger 42 is selectively engageable and disengageable by beater-control means comprising a chain lifter 172. The chain lifter comprises an arm 174 pivoted on the axle 22 just inwardly of the drive sprocket 60 (Figs. 2 and 9). The chain lifter 172 is effective, when moved forwardly or in a clockwise direction as viewed in Fig. 2, to lift the lower run of the chain 62 from the driving sprocket 60, thus disconnecting the drive to the beaters 44 and 46 and the auger 42.

Rocking of the chain lifter 172 is accomplished by means of a forwardly extending control rod 176 connected at its rear end to the chain lifter arm 174 and connected at its forward end to an intermediate arm 178 keyed to a transverse rockshaft 180 that is shown as being coaxial with the feed control rockshaft 133; although, the construction may be otherwise. As shown in Fig. 7, the rockshaft 180 is supported adjacent its outer end in a bearing 182 and at its inner end in a bearing 184 supported in any appropriate manner as by a bracket 186. A beater-control member or lever 188 is fixed at its lower end to an inner portion of the rockshaft 180 and extends upwardly alongside the feed-control lever 141, passing through an arcuate slot 190 parallel to but not coextensive with the slot 143. The lever 188 is equipped with a conventional detent or release means 192, the lower portion of which is selectively engageable with either of two notches 194 and 196 for fixing the position of the lever 188 at either end of the slot 190. The slot 190 terminates substantially at the midpoint of the adjacent slot 143, so that the control levers 141 and 188 are in side-by-side relationship (Fig. 6) when both the feed drive means and the beater drive means are disengaged or disconnected. In other words, when the feed-control lever 141 is in its intermediate position as shown in Fig. 6, the pawl-control means 113 is so positioned as to confine both drive pawls 101 and 103 against engagement with either of the ratchet wheels 85 or 87, so that reciprocation of the pitman 93 does not transmit motion to the ratchet wheel means 83. Also, when the beater-control lever 188 is fixed in position by engagement of the detent means 192 with the upper or rearward notch 194, as shown in Fig. 6, the chain lifter 172 is moved forwardly from its position shown in Fig. 2 so as to raise the lower run of the chain 62 from the driving sprocket 60. Thus, the spreader may be towed simply as a wagon and the axle 22 is rotated as the weels 24 and 25 rotate, and no drive is transmitted to any of the operating mechanisms.

The connection of the wheels 24 and 25 to the driving mechanism may be other than that indicated, and it should be borne in mind that although Fig. 9 shows the axle 22 as being journaled in bearings 198 and 199 carried by the body 20, variations may be resorted to without departing from the principles of the present invention.

It is desirable that the operation of the feed means be coordinated with that of the beater means. Accordingly, the control levers 141 and 188 are equipped with interlock means, designated generally by the numeral 200 and preferably comprising an arcuate forward extension 201 and a shorter rearward extension 203 connected to or rigid with the feed-control lever 141 (Fig. 6). The forward extension 201 is bent inwardly at its front end portion at 205 to provide a lug or stop, and a second lug or stop 207 is formed by an inwardly turned rear portion of the rearward extension 203. The spaced apart relationship of the lugs 205 and 207 provides lost-motion limit means which functions in a manner to be presently described.

As will be seen, the lugs 205 and 207 project across the path of movement of the beater-control lever 188 as that lever is moved between its notches 194 and 196, the lug 207 projecting behind the beater-control lever 188 and the lug 205 projecting in front or ahead of the beater-control lever 188.

As described above, when the levers are in their side-by-side positions as shown in Fig. 6, neither the apron nor the beaters are driven. Thus, the feed-control lever 141 is in what may be termed a "neutral" position, the feed means or apron being idle. The lever 141 is movable forwardly to what may be termed a "feed" position and is further movable rearwardly or in the opposite direction from its neutral position to what may be termed a "reverse" position. The beater-control lever 188 has only two positions: That shown in Fig. 6, which is a "stop" position (since the beaters and auger are idle) and a forward position in which the detent means 192 engages the forward notch 196, in which case the lever 188 is in a "run" position (establishing drive to the beaters and auger). These legends are used in the schematic illustration in Fig. 8, which is designed fundamentally to illustrate that both pawls 101 and 103 are kept out of engagement with the ratchet wheel means 83 by the arcuate portions 121 and 123 respectively on the pawl-control means 113. Likewise, the lower run of the chain 62 is shown as being kept out of engagement with the sprocket 60 by the chain lifter 172. Dotted lines have been used to represent the ratchet wheel means 83 and sprocket 60 in the interests of clarity so that the controlling parts may be more readily seen.

Because of the detent means 151 on the lever 141 and the detent means 192 on the lever 188, the levers are fixable or settable in certain positions. For example, the lever 141 is settable in a plurality of positions between that shown in Fig. 6 and the position the lever occupies when the detent means 151 engages the forward notch 147. The lever 188 has two fixable or settable positions represented by the notches 194 and 196.

Inasmuch as the lever 188 obstructs the lug 207 when the lever 188 is in its stop position as shown in Fig. 6, the feed-control lever 141 cannot be moved forwardly. In other words, the lever 188 must first be moved forwardly to its run position before the feed-control lever 141 can be moved to any of its forward positions. This insures that the beater will be started before the apron and avoids moving the load up against the idle or stationary beaters.

When the beater-control lever 188 is in its run position, in which case the detent 192 is engaging the forward notch 196, fore-and-aft swinging movement of the feed-control lever 141 is confined to the first arcuate portion of the slot 143, because the lever 188, in its run position, will engage the limit means afforded by the front lug 205 on the extension 201 of the feed-control lever 141. Accordingly, the apron cannot be reversed while the beaters are operating. Stated otherwise, the beaters must first be disengaged before the apron can be reversed. This is important when it is considered that both the beaters and the feed apron are driven by the wheels 24 and 25. For example, in the event of a substantial overload on the operating mechanism, the entire unit, comprising the tractor and spreader, may be caused to stall. Accordingly, if the beaters can be disengaged, this much of the load is relieved, making forward movement of the tractor and spreader considerably easier so that sufficient power is available for reversing the apron. When the detent means 151 on the lever 141 is held in released position, and the beater-control lever 188 is in its stop position, the lever 141 may be swung throughout substantially the entire range of the slot 143 and its rearward extension 167. During the latter portion of the range, the operator will "feel" the resistance set up by the means 169—171, so that he knows when he is operating in the reverse range. If he holds the lever 141 in its rearward or reverse position, the lug or stop 205 interferes with forward movement of the beater-control lever 188. Thus, the beater-control lever 188 cannot be moved to its run position while the lever 141 is in its reverse position. However, as soon as the feed-control lever 141 is restored to its neutral position, the beater may be operated as before.

It will be seen from the foregoing that the arm 97 comprises a pawl carrier supported by the spreader body for reciprocation adjacent to the ratchet wheels 85 and 87 and that it carries the first and second axially offset pawls 101 and 103 which extend respectively in circumferentially opposite directions so as to engage the ratchet wheels 85 and 87. The pawls are biased for engagement with the respective ratchet wheels but at times are held out of engagement by the first and second pawl-lifting members comprising the pawl-control flanges 121 and 123. These two members are interconnected by being formed integral with the single pawl-control means 113. The pawl carrier 97 is reciprocated by the pitman 93. Stated otherwise, the pawls 101 and 103 constitute pawl means selectively engageable with the ratchet wheel means so that in one setting, the pawl 101 is effective in one direction of reciprocation to engage the ratchet wheel 85 and in its opposite direction to ratchet over that wheel. Meanwhile, the pawl 103 is idle. In the other setting of the pawl-control means, the pawl 103 is effective on the forward stroke of the member 97 to engage the teeth in the ratchet wheel 87 but on the rearward stroke the pawl 103 ratchets over the teeth of the wheel 87. Broadly, the pitman 93 and the arm 97 constitute drive means and the ratchet wheel means 83 constitutes driven means.

Fundamentally, the feed means or apron is drivable in either a rearward or a forward direction by the reversible step-by-step mechanism particularly shown in Figs. 3, 4 and 5. This mechanism derives its power from the reciprocating means 93—97 in such manner that rearward stokes of the reciprocating means are effective to drive the apron in a rearward direction and forward strokes of the reciprocating means are effective to drive the apron in a forward direction. The pawl-control means in cooperation with the pawls renders the drive mechanism selective at the will of the operator through the medium of the interlocking control levers 141 and 188.

Other features and advantages of the invention not specifically enumerated herein will undoubtedly occur to those versed in the art without further elaboration here.

What is claimed is:

1. In a manure spreader: a longitudinal body having a discharge end and including a floor along which manure is fed to said discharge end; an endless-belt type feeder apron running lengthwise of the body with its upper run overlying the floor; reversible drive means supported by the spreader body and engaging the apron and including an input shaft; first and second coaxial toothed ratchet wheels keyed to the input shaft and respectively having their teeth pointing in circumferentially opposite directions; a pawl carrier supported by the spreader body for reciprocation adjacent to the ratchet wheels and in a path transverse to the axis of the ratchet wheels; means connected to and for reciprocating the pawl carrier; first and second axially offset pawls pivotally carried by the pawl carrier and extending respectively in circumferentially opposite directions and respectively biased to engage the teeth of the first and second ratchet wheels; a first pawl-lifting member shiftably mounted on the spreader body and operatively connected to the first pawl to selectively effect engagement and disengagement of said first pawl and first ratchet wheel; a second pawl-lifting member shiftably mounted on the spreader body and operatively connected to the second pawl to selectively effect engagement and disengagement of said second pawl and second ratchet wheel; and means interconnecting the pawl-lifting members for simultaneously shifting either pawl-lifting member to pawl-disengaging position and the other pawl-lifting member to pawl-disengaging position.

2. In a manure spreader: a manure-containing body having opposite ends, one of which is a discharge end; beater means carried by the body at its discharge end for engaging body-contained manure to distribute such manure outwardly of said discharge end; feed means carried by the body and arranged for movement selectively in a feed direction to feed body-contained manure toward the discharge end and beater means or in a reverse direction to carry such manure toward the opposite end of the body and away from the beater means; ratchet wheel means journaled on the body and drivingly connected to the feed means; reciprocating means carried by the body adjacent to the ratchet wheel means and reciprocable in first and second opposite strokes; pawl means carried by the reciprocating means for reciprocation therewith, said pawl means being selectively settable relative to the drive means and ratchet wheel means in a first position to alternately engage and ratchet over the ratchet wheel means respectively on the first and second strokes of the drive means for rotating the ratchet wheel means in one direction, or in a second position to alternately engage and ratchet over the ratchet wheel means respectively on the second and first strokes of the drive means for rotating the ratchet wheel means in the opposite direction; and means shiftable on the body and connected to the pawl means for setting the pawl means selectively in its aforesaid first and second positions.

3. In a manure spreader: a longitudinal body having a discharge end and including a floor along which manure is fed to said discharge end; an endless belt type feeder apron running lengthwise of the body with its upper run overlying the floor; reversible drive means supported by the spreader body and engaging the apron and including an input shaft; first and second coaxial toothed ratchet wheels keyed to the input shaft and respectively having their teeth pointing in circumferentially opposite directions; a driving arm journaled on the input shaft axis and extending radially to an outer end portion adjacent to the peripheries of the ratchet wheels; means connected to and for reciprocating the arm; first and second axially offset pawls pivoted coaxially to the outer end portion of the arm and extending respectively in circumferentially opposite directions and respectively biased to engage the first and second ratchet wheels; and a pawl control element rockable on the input shaft axis and having first and second arcuate pawl-engaging portions offset both axially and angularly to respectively engage with the first and second pawls, said control element having a neutral position in which the first and second arcuate portions respectively intervene between the first and second pawls and the ratchet wheels, and said control element being rockable selectively in opposite directions to either side of its neutral position to free one pawl from one arcuate portion for engagement with its associated ratchet wheel while retaining intervention of the other arcuate portion between the other pawl and the other ratchet wheel.

4. In a manure spreader: a longitudinal body having a discharge end and including a floor along which manure is fed to said discharge end; an endless-belt type feeder apron running lengthwise of the body with its upper run overlying the floor; reversible drive means supported by the spreader body and engaging the apron and including an input shaft; first and second coaxial toothed ratchet wheels keyed to the input shaft and respectively having their teeth pointing in circumferentially opposite directions; reciprocating means carried by the body adjacent to the ratchet wheels and reciprocable in first and second opposite strokes; first and second pawls pivoted to the reciprocating means in axially offset relationship according to the axial offset of the ratchet wheels and extending respectively in circumferentially opposite directions and respectively biased to engage the first and second ratchet wheels; and pawl control means adjustably settable on the body in first and second positions, said control means being engageable in its first position with the first pawl to lift said pawl from the first ratchet wheel while leaving the second pawl in biased engagement with the second ratchet wheel for effecting rotation of the input shaft in one direction on first strokes of the reciprocating means and engageable in its second position with the second pawl to lift said second pawl from the second ratchet wheel while effecting return of the first pawl to its biased engagement with the first ratchet wheel for effecting rotation of the input shaft in the opposite direction on second strokes of the reciprocating means.

5. In a manure spreader: a manure-containing body having opposite ends, one of which is a discharge end; beater means carried by the body at its discharge end for engaging body-contained manure to distribute such manure outwardly of said discharge end; feed means carried by the body and arranged for movement selectively in a feed direction to feed body-contained manure toward the discharge end and beater means or in a reverse direction to carry such manure toward the opposite end of the body and away from the beater means; and reversible step-by-step mechanism for selectively driving the feed means in either of the aforesaid directions, said mechanism including a driven element movable on the body and connected to the feed means, reciprocating means carried by the body for reciprocation in first and second opposite strokes adjacent to the driven element, first and second driving means connected to the reciprocating means and selectively drivingly engageable with and disengageable from the driven element; and control means shiftable on the body and operatively connected to the two driving means for setting in a first position effecting engagement of the first driving means with and disengagement of the second driving means from the driven element to connect the reciprocating means to the driven element on only the first strokes of said reciprocating means, and in a second position effecting engagement of the second driving means with and disengagement of the first driving means from the driven element to connect the reciprocating means to the driven element on only the second strokes of said reciprocating means.

6. In a manure spreader: a mobile fore-and-aft extending body having front and rear ends and adapted to contain manure, said rear end comprising a discharge outlet; beater means movably carried by the body at its discharge end for engaging body-carried manure and for distributing such manure outwardly through said discharge end; feed means carried by the body and engaging the manure therein and optionally movable forwardly or rearwardly to feed the manure either rearwardly toward the beater means or forwardly away from the beater means; selectively engageable and disengageable beater drive means on the body and connected to the beater means for selectively stopping and running the beater means; selectively engageable, reversible and disengageable feed drive means on the body and connected to the feed means for selectively idling the feed means or for driving the feed means either rearwardly or forwardly; a beater control member connected to the beater drive means and movable on the body forwardly from a fixable stop position to a fixable run position and return for respectively running and stopping the beater means; a feed control member connected to the feed drive means and movable on the body forwardly from a fixable neutral position, in which the feed means is idle, to a fixable feed position, for driving the feed means rearwardly, and movable rearwardly from said neutral position to a reverse position for driving the feed means forwardly; said control members being arranged so that they are substantially in side-by-side relationship when they are respectively in their stop and neutral positions; first lug means on the feed control member and engaging the beater control member from behind when the members are respectively in their stop and neutral positions so that the feed control member is precluded from forward movement until the beater control member is first moved forwardly; and second lug means on the feed control member and spaced forwardly thereof and engageable with the front of the beater control member so that the beater control member is precluded from rearward movement to its reverse position while the beater control member is in its run position.

7. The invention defined in claim 6, in which: yielding means is carried by the body and positioned in the path of rearward movement of the feed control member from its neutral position for affording resistance to such rearward movement.

8. In a manure spreader: a mobile fore-and-aft extending body having front and rear ends and adapted to contain manure, said rear end comprising a discharge outlet; beater means movably carried by the body at its discharge end for engaging body-carried manure and for distributing such manure outwardly through said discharge end; feed means carried by the body and engaging the manure therein and optionally movable forwardly or rearwardly to feed the manure either rearwardly toward the beater means of forwardly away from the beater means; selectively engageable and disengageable beater drive means on the body and connected to the beater means for selectively stopping and running the beater means; selectively engageable, reversible and disengageable feed drive means on the body and connected to the feed means for selectively idling the feed means or for driving the feed means either rearwardly or forwardly; a beater control member connected to the beater drive means and movable on the body forwardly from a fixable stop position to a fixable run position and return for respectively running and stopping the beater means; a feed control member connected to the feed drive means and movable on the body forwardly from a fixable neutral position, in which the feed means is idle, to a fixable feed position, for driving the feed means rearwardly, and movable rearwardly from said neutral position to a reverse position for driving the feed means forwardly; said control members being arranged so that they are substantially in side-by-side relationship when they are respectively in their stop and neutral positions; and limit means connected to one member and projecting into the path of movement of the other member and effective to preclude forward movement of the beater to its run position while the feed control member is in its neutral position.

9. In a manure spreader: a mobile fore-and-aft extending body having front and rear ends and adapted to contain manure, said rear end comprising a discharge outlet; beater means movably carried by the body at its discharge end for engaging body-carried manure and for distributing such manure outwardly through said discharge end; feed means carried by the body and engaging the manure therein and optionally movable forwardly or rearwardly to feed the manure either rearwardly toward the beater means or forwardly away from the beater means; selectively engageable and disengageable beater drive means on the body and connected to the beater means for selectively stopping and running the beater means; selectively engageable, reversible and disengageable feed drive means on the body and connected to the feed means for selectively idling the feed means or for driving the feed means either rearwardly or forwardly; a beater control member connected to the beater drive means and movable on the body forwardly from a fixable stop position to a fixable run position and return for respectively running and stopping the beater means; a feed control member connected to the feed drive means and movable on the body forwardly from a fixable neutral position, in which the feed means is idle, to a fixable feed position, for driving the feed means rearwardly, and movable rearwardly from said neutral position to a reverse position for driving the feed means forwardly; said control members being arranged so that they are substantially in side-by-side relationship when they are respectively in their stop and neutral positions; and limit means connected to one member and projecting into the path of movement of the other member and effective to preclude rearward movement of the feed control member from its neutral position while the beater control member is in its run position.

10. The invention defined in claim 9, in which: said limit means provides a fore-and-aft lost-motion range enabling free fore-and-aft movement of the beater control member from its neutral position to its feed position and return.

11. The invention defined in claim 9, in which: yielding means is carried by the body and positioned to engage the feed control member substantially at the neutral position thereof to afford resistance to movement of the feed control member to its reverse position when the beater control member is moved to its stop position.

12. In a manure spreader: a manure-containing body having opposite ends, one of which is a discharge end; beater means carried by the body at its discharge end for engaging body-contained manure to distribute such manure outwardly of said discharge end; feed means carried by the body and arranged for movement selectively in a feed direction to feed body-contained manure toward the discharge end and beater means or in a reverse direction to carry such manure toward the opposite end of the body and away from the beater means; beater drive means on the body and connected to the beater for selectively running or stopping the beater; reversible feed drive means on the body and connected to the feed means for driving the feed means optionally in a feed direction or a reverse direction; a beater control member connected to the beater drive means and shiftable on the body between run and stop positions to respectively run or stop the beater; a feed control member connected to the feed drive means and shiftable on the body adjacent to the beater control member between feed and reverse positions to respectively operate the feed means in feed or reverse directions; first interlock means operative between the control members for preventing shifting of the feed control member to its reverse position until the beater control member is first moved to its stop position; and second interlock means operative between the control members for preventing shifting of the beater control member to its stop position while the feed control member is in its feed position.

13. In a manure spreader: a mobile fore-and-aft extending body having front and rear ends and adapted to contain manure, said rear end comprising a discharge outlet; beater means movably carried by the body at its discharge end for engaging body-carried manure and for distributing such manure outwardly through said discharge end; feed means carried by the body and engaging the manure therein and optionally movable forwardly or rearwardly to feed the manure either rearwardly toward the beater means or forwardly away from the beater means; selectively engageable and disengageable beater drive means on the body and connected to the beater means for selectively stopping and running the beater means; selectively engageable, reversible and disengageable feed drive means on the body and connected to the feed means for selectively idling the feed means or for driving the feed means either rearwardly or forwardly; a beater control member connected to the beater drive means and movable on the body forwardly from a fixable stop position to a fixable run position and return for respectively running and stopping the beater means; a feed control member connected to the feed drive means and movable on the body forwardly from a fixable neutral position, in which the feed means is idle, to a fixable feed position, for driving the feed means rearwardly, and movable rearwardly from said neutral position to a reverse position for driving the feed means forwardly; and limit means including cooperatively interengageable portions of the control members effective to confine the feed control member to fore-and-aft movement between its neutral and feed positions while the beater control member is in its run position.

References Cited in the file of this patent

UNITED STATES PATENTS

| | | |
|---|---|---|
| 863,782 | Callan | Aug. 20, 1907 |
| 1,129,701 | McCoy | Feb. 23, 1915 |
| 1,463,492 | Varland | July 31, 1923 |
| 1,868,337 | Storm | July 19, 1932 |
| 1,979,945 | Kranick | Nov. 6, 1934 |
| 2,302,879 | Neighbour et al. | Nov. 24, 1942 |
| 2,342,837 | Brown | Feb. 29, 1944 |